United States Patent
Papi et al.

(10) Patent No.: US 12,409,852 B2
(45) Date of Patent: Sep. 9, 2025

(54) OBJECT DETECTION USING SIMILARITY DETERMINATIONS FOR SENSOR OBSERVATIONS

(71) Applicant: Zoox, Inc., Foster City, CA (US)

(72) Inventors: Francesco Papi, Oakland, CA (US); Qian Song, San Mateo, CA (US); John Bryan Carter, Upton, MA (US); Shuangting Liu, Foster City, CA (US); Zachary Sun, San Francisco, CA (US); Cong Ding, San Jose, CA (US); Murat Gevrekci, Mountain View, CA (US)

(73) Assignee: Zoox, Inc., Foster City, CA (US)

( * ) Notice: Subject to any disclaimer, the term of this patent is extended or adjusted under 35 U.S.C. 154(b) by 296 days.

(21) Appl. No.: 18/103,936

(22) Filed: Jan. 31, 2023

(65) Prior Publication Data
US 2024/0253659 A1    Aug. 1, 2024

(51) Int. Cl.
*B60W 60/00* (2020.01)
*B60W 30/095* (2012.01)
*B60W 40/02* (2006.01)

(52) U.S. Cl.
CPC ...... *B60W 60/001* (2020.02); *B60W 30/0956* (2013.01); *B60W 40/02* (2013.01); *B60W 2420/403* (2013.01); *B60W 2420/408* (2024.01); *B60W 2554/00* (2020.02)

(58) Field of Classification Search
CPC ............ B60W 30/0956; B60W 60/001
See application file for complete search history.

(56) References Cited

U.S. PATENT DOCUMENTS

| | | | | |
|---|---|---|---|---|
| 12,060,078 | B2* | 8/2024 | Lee | G06V 20/584 |
| 12,128,895 | B2* | 10/2024 | Seong | B60W 30/18159 |
| 2021/0209772 | A1* | 7/2021 | Li | G06V 20/58 |
| 2023/0192121 | A1* | 6/2023 | Zhang | G06F 18/23213 |
| | | | | 701/25 |
| 2023/0207120 | A1* | 6/2023 | Wu | G06N 3/044 |
| | | | | 705/2 |

OTHER PUBLICATIONS

Aayush, et al.; Real-Time Generalized Sensor Fusion with Transformers, retrieved on Mar. 19, 2024 at URL:https://ml.4ad.github.io/files/papers2021/Real-time%20Generalized%20Sensor%20Fusion%20with%20Transformers.pdf, Published Dec. 6, 2021, pp. 1-11.
PCT Search Report and Written Opinion mailed Apr. 22, 2024, for PCT application No. PCT/US2024/013340, 16 pages.
Yin, et al; Learning for Graph Matching Based Multi-Object Tracking in Auto Driving, https://iopscience.iop.org/article/10.1088/1742-6596/1871/1/012152/pdf, Journal of Physics: Conference Series, vol. 1871, No. 1, Apr. 1, 2021, pp. 1-7.

\* cited by examiner

*Primary Examiner* — Jess Whittington
(74) *Attorney, Agent, or Firm* — Lee & Hayes, P.C.

(57) ABSTRACT

Techniques for performing object detection in a vehicle environment using sensor data captured by one or more sensors of the vehicle are described herein. In some cases, an object in a vehicle environment can be detected based on at least one of (i) a first similarity matrix that represents a first similarity value for two sensor observations associated with the vehicle environment, or (ii) a second similarity matrix that represents a second similarity value for a sensor observation and a track associated with the vehicle environment.

20 Claims, 6 Drawing Sheets

OBJECT DETECTION USING SIMILARITY DETERMINATIONS FOR SENSOR OBSERVATIONS

BACKGROUND

Autonomous vehicles perform object detection operations as part of determining recommended trajectories. However, object detection operations can be inaccurate and/or inefficient, which can present challenges when controlling the autonomous vehicle through an environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
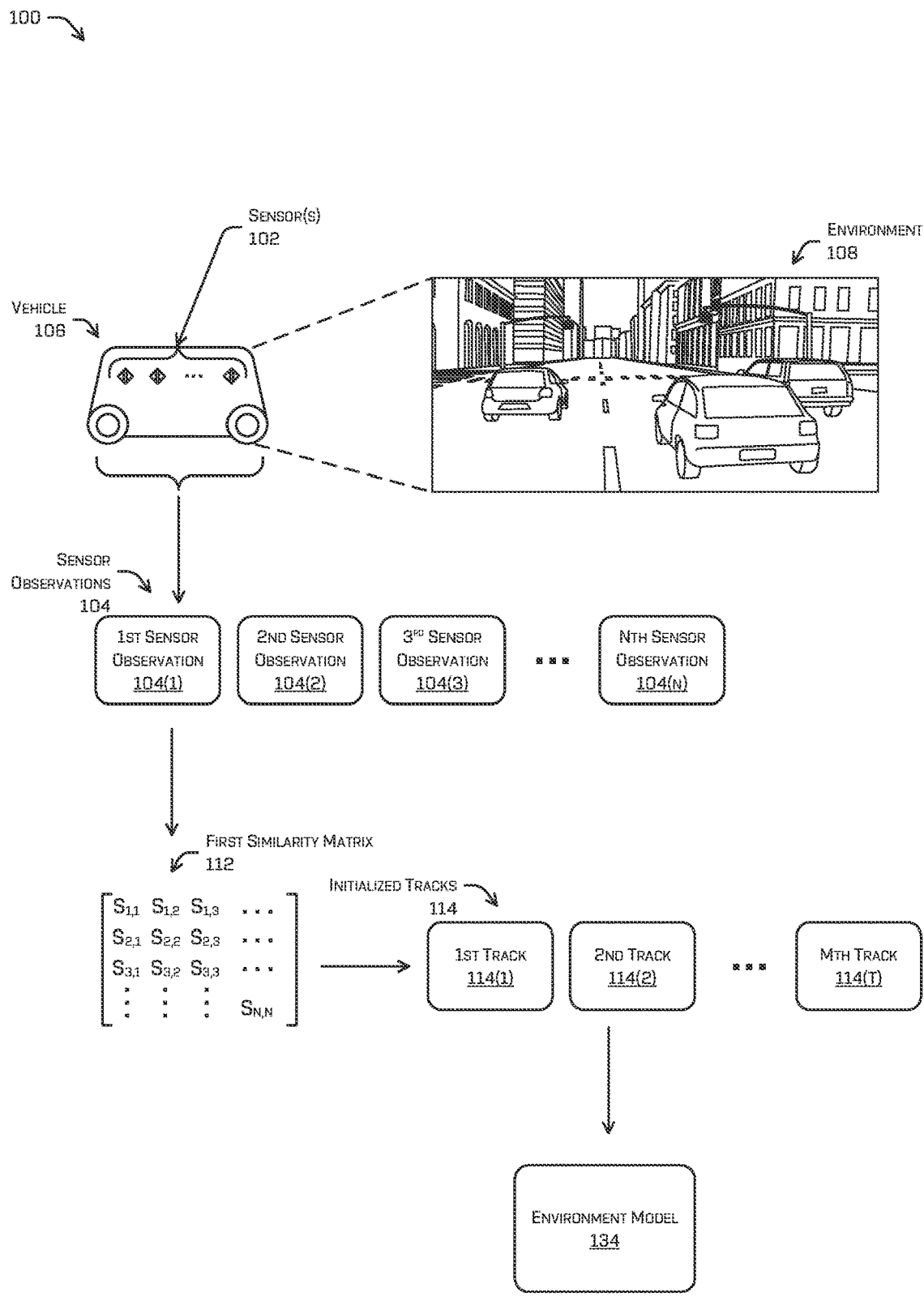
FIG. 1 illustrates an example architecture for detecting a set of objects in a vehicle environment using a set of machine learning models.

Techniques for performing object detection in a vehicle environment using sensor data captured by one or more sensors of the vehicle are described herein. The described techniques can be used to detect one or more objects in the vehicle environment, determine predicted trajectories for the objects based on detections of the objects over time, determine a recommended trajectory for the vehicle in accordance with the predicted object trajectories, and control the vehicle in accordance with the recommended trajectory. In some cases, the recommended trajectory for the vehicle is determined in a manner that is expected to increase the likelihood that the vehicle is operated in compliance with relevant traffic regulations and avoids collision with other objects in the vehicle environment. Accordingly, the techniques discussed herein may improve the safety of occupants of an autonomous vehicle that incorporates the techniques discussed herein. Moreover, the techniques may improve the efficiency of a vehicle, such as an autonomous vehicle, in accomplishing a mission such as, for example, delivering passengers and/or cargo, surveying a region, or the like.

In some cases, the techniques discussed herein include detecting one or more objects in a vehicle environment based on a first similarity matrix that represents similarity values for pairs of sensor observations associated with the vehicle environment. In some cases, sensor data representing the vehicle environment is used to determine N sensor observations. In some of those cases, the first similarity matrix represents N×N similarity values, with each similarity value representing a predicted similarity of two sensor observations. In some cases, once the first similarity matrix is determined, the first similarity matrix can be used to detect one or more objects in the vehicle environment.

In some cases, a sensor observation may represent a detection of at least one object in the vehicle environment in sensor data obtained from one or more sensors associated with a vehicle. In some cases, a sensor observation represents a portion of sensor data obtained from a sensor at a particular time that is predicted to depict an object. In some cases, sensor observations determined based on sensor data for a vehicle environment include at least one of the following: one or more single-modality observations or one or more cross-modality observations.

In some cases, a single-modality observation may be a sensor observation that is determined based on sensor data associated with a single sensor modality, for example by detecting an object in a region of the sensor data associated with the single sensor modality. Examples of sensor modalities include lidar, radar, sonar, and/or an image sensor (e.g., an image sensor including at least one of a visible light spectrum camera, a depth camera, an infrared camera, and/or the like).

In some cases, a cross-modality observation may be a sensor observation that is determined based on sensor data associated with more than one sensor modality. In some cases, given a set of sensor modalities associated with the sensors of a vehicle, the sensor data captured by at least two (e.g., all) of the described sensor modalities at a first time may be collectively processed by a machine learning model (e.g., a deep tracking network machine learning model) to determine a set of cross-modality observations for the respective vehicle environment. For example, in some cases, at least two of sensor data captured by a lidar sensor at a first time, sensor data captured by a radar sensor at the first time, sensor data captured by a sonar sensor at the first time, or sensor data captured by an image sensor at the first time may be collectively processed to determine a set of cross-modality observations for the respective vehicle environment.

In some cases, after a set of sensor observations associated with a vehicle environment are received and/or determined, the set of sensors observations may be used to determine the first similarity matrix. In some cases, the first similarity matrix may represent a first similarity value that represents a predicted measure of similarity between a first sensor observation and a second sensor observation associated with a vehicle environment. In some cases, given a set of N sensor observations associated with a vehicle environment at a first time, the first similarity matrix represents N×N similarity values, with each similarity value being associated with a pair of sensor observations from the set of N sensor observations and representing a predicted measure of similarity of the pair.

In some cases, the similarity value associated with a first sensor observation and a second observation is determined based on a distance between a first embedding of the first sensor observation and a second embedding of the second sensor observation in an embedding space. For example, in some cases, the first representation is processed by an embedding generation machine learning model (e.g., an encoder machine learning model) to generate a first embedding, the second representation is processed by the embedding generation machine learning model to generate a second embedding, the two embeddings are mapped to an embedding space, and a magnitude of a vector between the mappings of the two embeddings in the embedding space is used to determine the similarity value for the corresponding sensor observation pair.

In some cases, the techniques described herein include determining a track based on the first similarity matrix. In some cases, T tracks are determined based on the first similarity matrix. In some cases, a track represents a collection of detections of an object in a vehicle environment across time. In some cases, a track represents feature data (e.g., position data, speed data, acceleration data, predicted trajectory data, and/or the like) associated with a set of detections of an object in a vehicle environment across time. For example, a track may represent all of the detections of a first vehicle that is in an environment of a second vehicle while the first vehicle is in the vehicle environment.

In some cases, the T tracks are determined based on sensor data associated with the vehicle environment at a first time (e.g., the time that is associated with the sensor data used to determine the first similarity matrix). In some cases, a first similarity matrix is determined that represents a similarity value for a first sensor observation and a second observation associated with a first time. In some cases, the first similarity matrix represents a similarity value for each pair of sensor observations selected from N sensor observations for the first time. In some of those cases, at least one of the similarity values of the first similarity matrix is used to determine T tracks. In some cases, to determine T tracks based on N sensor observations, first N tracks are initialized, then the N sensor observations are assigned to at least a first subset of the initialized N tracks (e.g., each sensor observation is assigned to an initialized track) based on the similarity values in the first similarity matrix, and then the T tracks are determined based on the described assignment. For example, the T tracks include all of the tracks in the first subset.

In some cases, the tracks determined based on the first similarity matrix represent objects detected in the vehicle environment at a first time that is associated with the first similarity matrix. Accordingly, in some of those cases, the tracks can be used to detect an object in the vehicle environment at the first time. In some cases, as further described below, the tracks can also be used to determine a second similarity matrix that can then be used to detect an object in the vehicle environment at a second time that follows the first time.

In some cases, the techniques discussed herein include detecting one or more objects in a vehicle environment based on a second similarity matrix that represents a similarity value for a track detected in the vehicle environment and a sensor observation determined based sensor data of the vehicle environment. In some cases, if a second similarity matrix is associated with M sensor observations and T tracks, the second similarity matrix for the vehicle environment includes M×T similarity values, with each similarity value representing a predicted measure of correspondence for a respective sensor observation from the M sensor observations and a respective track from the T tracks. A predicted measure of correspondence may represent a predicted likelihood that a track and a sensor observation are associated with a common object. In some cases, if a second similarity matrix is associated with M sensor observations and T tracks, the second similarity matrix includes T occlusion values, with each occlusion value representing whether a corresponding track in the T tracks is determined to correspond to at least one of the M sensor observations. Accordingly, in some cases, the second similarity matrix includes (M)×(T+1) values including M×T similarity values and T occlusion values.

In some cases, the second similarity matrix is associated with M sensor observations and T tracks. The M sensor observations may include the N sensor observations associated with a first time (e.g., the sensor observations whose similarity values are described by the first similarity matrix) and/or a set of sensor observations that are determined or received at a second time that follows the first time. For example, in some cases, a set of N sensor observations are determined based on sensor data for the first time, and the N sensor observations are used to determine T tracks. Then, M additional sensor observations may be determined based on sensor data associated with the second time. In some cases, the second similarity matrix represents similarity values for the T tracks determined based on the sensor data for the first time in relation to the M sensor observations determined based on the sensor data for the second time. In this way, the second similarity matrix may be used to determine which of the T tracks determined for the first time correspond to the M sensor observations determined for the second time. In some cases, such determinations about correspondence of the T tracks to the M sensor observations are represented by the occlusion values in the second similarity matrix.

In some cases, the second similarity matrix may represent a similarity value for a track that is detected in a vehicle environment and a sensor observation determined based on the sensor data for the vehicle environment. In some cases, the second similarity matrix may represent whether a track is determined to correspond to any of M sensor observations that are associated with the second similarity matrix. For example, in some cases, a track is determined to correspond to a sensor observation if the similarity value for the track and the sensor observation exceeds a threshold. In some cases, if a track is determined to not correspond to any of the M sensor observations, the track is assigned a first occlusion value (e.g., an occlusion value of zero) that may represent that the track is not in a vehicle environment at a time associated with the M sensor observations. In some cases, if a track is determined to correspond to at least one of the M sensor observations, the track is assigned a second occlusion value (e.g., an occlusion value of one) that may represent that the track is in the vehicle environment at a time associated with the M sensor observations. Accordingly, the second similarity matrix can be used to determine whether an object corresponding to a previously-detected track is still in the vehicle environment at a subsequent time associated with the M sensor observations.

In some cases, the techniques discussed herein include detecting one or more objects in a vehicle environment based on a third similarity matrix that represents similarity values between a pair of sensor observations in a vehicle environment that have not been determined to correspond to a track in the vehicle environment. In some cases, the second similarity matrix may represent that a first subset of the M sensor observations that are associated with the second similarity matrix that do not correspond to any of the T tracks that are associated with the second similarity matrix. In some cases, the third similarity matrix represents, for a first sensor observation and a second sensor observation in the first subset (e.g., for each sensor observation pair from the first subset), a similarity value that represents a predicted measure of similarity between the two sensor observations. In some cases, given L sensor observations that have not been assigned to any tracks, the third similarity matrix includes L*L similarity values, with each similarity value representing the predicted measure of similarity between a pair of sensor observations from the L sensor observations.

In some cases, the techniques described above for determining a first similarity matrix based on a first set of sensor observations (e.g., based on N sensor observations) can be used in relation to a second set of sensor observations (e.g., L sensor observations) to determine the third similarity matrix.

In some cases, the third similarity matrix can be used to determine R tracks, for example by using the techniques described above for determining the T tracks based on a first set of sensor observations (e.g., based on the N sensor observations associated with the first similarity matrix). In some cases, an updated set of S tracks are determined based on at least one of the T tracks determined based on the first similarity matrix or the R tracks determined based on the third similarity matrix. For example, the set of S updated tracks may include the R tracks in addition to a first subset of the T tracks that are determined to correspond to at least one of the M sensor observations associated with the second similarity matrix (e.g., a first subset including sensor observations with an occlusion value of one). This set of S updated tracks may then be used to determine a fourth similarity matrix that represents similarity values between S updated tracks and a set of sensor observations (e.g., a set of K sensor observations associated with a third time that follows the first time associated with the first similarity matrix and the second time associated with the second similarity matrix). In some cases, the described process may be repeated across time until a stopping condition is reached (e.g., the vehicle is turned off, a destination is reached, and the like).

In some cases, the techniques discussed herein can be implemented to facilitate and/or enhance safety of automated navigation features in vehicles, such as in automated vehicles or semi-automated vehicles. For example, the techniques can be used to determine a recommended trajectory for an autonomous vehicle based on objects associated with the vehicle environment and control the autonomous vehicle based on the recommended trajectory. As another example, the techniques can be used to determine that a current trajectory of a vehicle is likely to collide with an object that is within the environment of the vehicle. Upon determining that the current trajectory is likely to collide with an object, the driver of the vehicle may be stopped from following the current trajectory and/or the driver of the vehicle may be alerted about the likelihood of collision. In some cases, upon determining that the current trajectory of an autonomous vehicle is likely to collide with an object in the autonomous vehicle environment, the driver of the autonomous vehicle may be alerted to exercise manual control of the autonomous vehicle.

In some cases, the techniques discussed herein can be implemented in a multi-sensor system, such as a multi-sensor system including image sensor(s) (e.g., RGB cameras), depth cameras (e.g., RGB D cameras (e.g., time-of-flight cameras)), lidar sensors, radar sensors, and/or sonar sensors, to reduce the effect of hardware or software failures. For example, in the event that a first sensor is occluded or broken, the techniques discussed herein can be used to reduce the effect of this event by enabling effective and accurate inferences across sensors. Thus, the techniques discussed herein provide additional improvements to object detection and/or computer vision systems, for example.

In some cases, the techniques described herein can be implemented to improve the accuracy of operation detections generated by object detection systems, and thus improve accuracy and operational effectiveness of such systems. For example, in some cases, by implementing techniques for performing object detection based on similarity matrices that represent similarities of sensor observations and/or similarity matrices that represent similarities of sensor observations and tracks, an object detection system can generate more effective object detection outputs for a vehicle environment. In some cases, the techniques described herein enable object detection based on predictive inferences across sensor modalities and/or across time, thus further increasing accuracy and operational effectiveness of performing object detection by an object detection system.

The methods, apparatuses, and systems described herein can be implemented in a number of ways. Example implementations are provided below with reference to the following figures. Although discussed in the context of a vehicle, the methods, apparatuses, and systems described herein can be applied to a variety of systems using computer vision techniques, and are not limited to vehicles. Moreover, although various computer vision operations are described as being performed by a perception component of a vehicle computing device, a person of ordinary skill in the relevant technology will recognize that the perception component may be deployed on other computing devices, such as on a remote computing device that communicates with a vehicle computing device using a networked connection.

Figure 2:
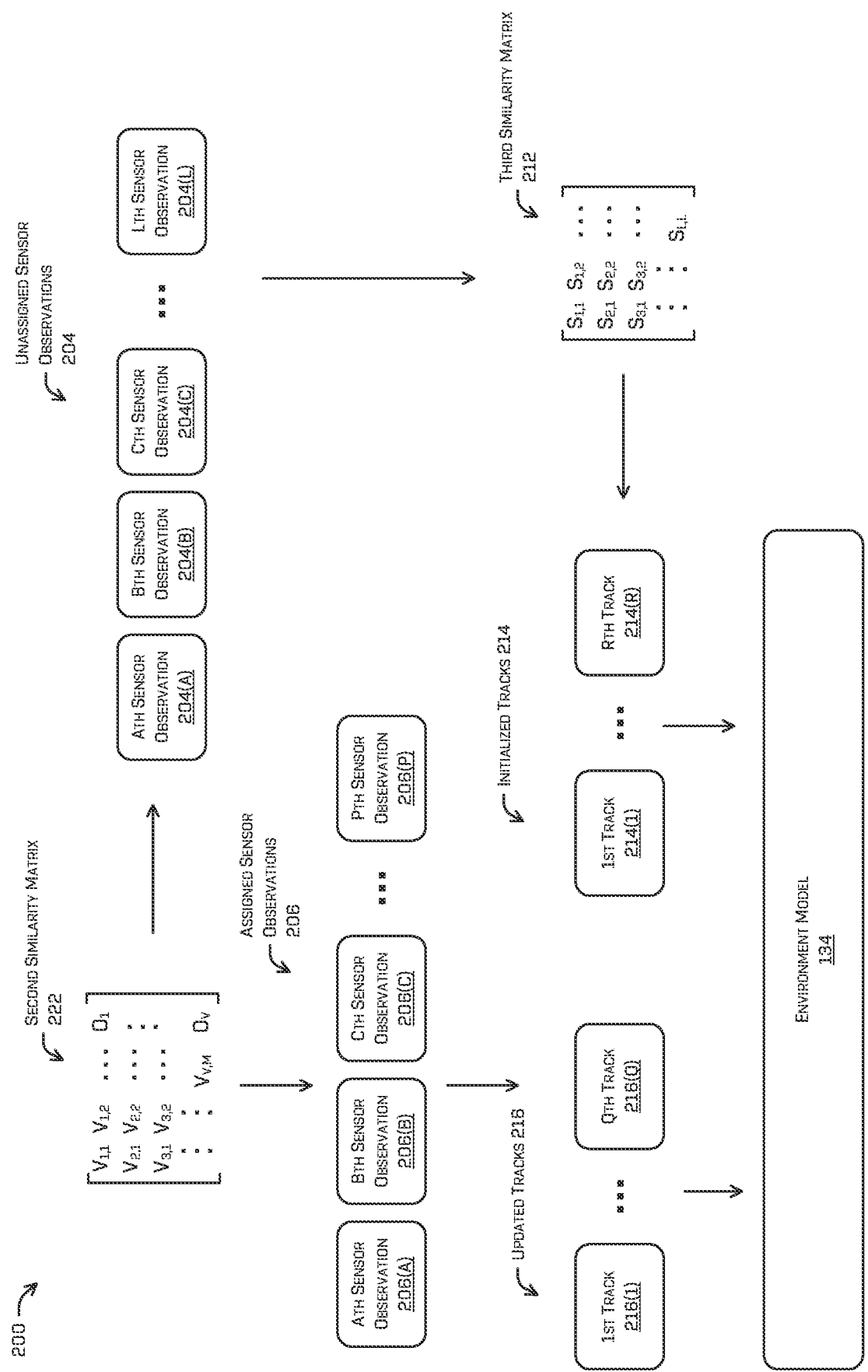
FIG. 2 depicts an example process for detecting a set of objects in a vehicle environment based on similarity values for sensor observations and tracks.

FIG. 1 illustrates an example architecture 100 for determining and/or updating an environment model 134 using sensor data captured by one or more sensors 102 of a vehicle 106. In some cases, the architecture 100 is used to initially determine a set of tracks associated with a set of objects in the environment based on a set of initial sensor observations associated with the environment. In some cases, after a set of tracks are initially determined using the architecture 100 of FIG. 1, the architecture 200 of FIG. 2 is used as part of an iterative process to update a set of tracks determined at one time using sensor data associated with a subsequent time.

In some examples, sensor data can be received from sensors 102 of a vehicle 106, from another vehicle, from a remote sensor system, and the like. The environment model 134 may represent one or more objects and/or one or more tracks detected in the environment 108 of the vehicle. As depicted in FIG. 1, a set of N sensor observations 104 may be determined based on sensor data associated with the vehicle 106 (e.g., based on sensor data associated with a first time). A sensor observation 104 may represent a detection of at least one object in the environment 108 in sensor data obtained from one or more sensors 102 having one or more sensor modalities (e.g., from the sensors of the vehicle 106). Exemplary techniques for determining the set of N sensor observations 104 are described below in relation to FIG. 3.

In some cases, a sensor observation 104 that is determined based on a first set of sensor data is associated with a corresponding object that is predicted to be depicted by the sensor observation, a sensor modality that represents the type of the sensor 102 used to obtain the first set of sensor data, and/or a corresponding time associated with the first set of sensor data (e.g., a time associated with capturing of the sensor data by the respective sensor 102). For example, in some cases, a first sensor observation 104 may be predicted to represent a first vehicle in the environment 108 in the lidar data associated with a first time. As another example, in some cases, a second sensor observation 104 may be predicted to depict a traffic light in the environment 108 in the lidar data associated with the first time. As yet another example, in some cases, a sensor observation 104 may be predicted to depict the first vehicle in the radar data associated with the first time. As a further example, in some cases, a sensor observation 104 may be predicted to depict the first vehicle in the lidar data associated with the first time.

In some cases, a sensor observation 104 includes at least one of: at least one of: a lidar-based observation determined based on lidar data, a radar-based observation determined based on radar data, a sonar-based observation determined based on sonar data, an image-based observation determined based on image data, or one or more observations determined by detecting correlations across the lidar data, the radar data, the sonar data, and the image data.

In some cases, sensor observations 104 include at least one of the following: one or more single-modality observations or one or more cross-modality observations. A single-modality observation may be a sensor observation that is determined based on sensor data associated with a single sensor modality, for example by detecting an object in a region of the sensor data associated with the single sensor modality. Examples of sensor modalities include lidar, radar, sonar, and/or an image sensor (e.g., an image sensor including at least one of a visible light spectrum camera, a depth camera, an infrared camera, and/or the like). In some cases, a set of single-modality sensor observations that are associated with a corresponding sensor modality may be determined by processing sensor data associated with the corresponding sensor modality using a perception machine learning model that is configured to detect objects in the sensor data of the corresponding sensor data. For example, a lidar point cloud of a vehicle environment may be used to detect a set of objects in the lidar point cloud and generate a set of single-modality observations based on the detected objects. As another example, an image of a vehicle environment may be used to detect a set of objects in the environment image and generate a set of single-modality observations based on the detected objects.

In some cases, a cross-modality observation may be a sensor observation that is determined based on sensor data associated with more than one sensor modality. In some cases, given a set of sensor modalities associated with the sensors of a vehicle, the sensor data captured by all of the described sensor modalities at a first time may be collectively processed by a machine learning model (e.g., a deep tracking network machine learning model) to determine a set of cross-modality observations for the respective vehicle environment. For example, in some cases, at least two of sensor data captured by a lidar sensor at a first time, sensor data captured by a radar sensor at the first time, sensor data captured by a sonar sensor at the first time, or sensor data captured by an image sensor at the first time may be collectively processed to determine a set of cross-modality observations for the respective vehicle environment. In some cases, a cross-modality observation represents a detection of an object in a vehicle environment in the sensor data associated with two or more sensor modalities. For example, a cross-modality observation may represent a region of lidar data associated with a first time that is predicted to depict a first vehicle and a region of sonar data associated with the first time that is predicted to depict the first vehicle.

In some cases, because cross-modality observations are determined using predictive inferences performed across sensor data of various modalities, such cross-modality observations are likely to represent objects that may not have been detected using sensor data of a single modality. For example, in some cases, while individually processing either lidar data or image data of a vehicle environment may fail to detect any objects in a first region of the vehicle environment, processing the lidar data and the image data collectively may detect that the first region depicts an object.

As further depicted in FIG. 1, the set of N sensor observations 104 may be used to determine a first similarity matrix 112. In some cases, the first similarity matrix 112 may include a first similarity value that represents a predicted measure of similarity between a first sensor observation and a second sensor observation associated with the environment 108. In some cases, given a set of N sensor observations associated with the environment 108 for a first time, the first similarity matrix represents N×N similarity values, with each similarity value being associated with a pair of sensor observations from the set of N sensor observations and representing a predicted measure of similarity of the pair. In the operational example of FIG. 1, each similarity value for a pair of sensor observations 104 that is represented by the first similarity matrix 112 is denoted as $S_{a,b}$, where a and b are numerical indicators of the two sensor observations in the pair. In some cases, the first similarity matrix 112 represents global pairwise interactions among the N sensor observations. In some cases, the first similarity matrix 112 is determined based on a machine learning model, such as a machine learning model that includes at least one of an attention-based mechanism, a convolutional mechanism, or a multi-scale mechanism.

In some cases, similarity values associated with sensor observation pairs are generated in a manner such that a sensor observation pair that includes two sensor observations associated with a common object has a higher similarity value relative to the similarity value of a sensor observation pair that includes two sensor observations that are not associated with a common object. For example, in some cases, if a first sensor observation and a second sensor observation both depict the same object in a vehicle environment, the two sensor observations may have a relatively high similarity value as represented by the first similarity matrix.

In some cases, the similarity value associated with a first sensor observation and a second observation is determined based on a distance between a first embedding of the first sensor observation and a second embedding of the second sensor observation in an embedding space. For example, in some cases, the first representation is processed by an embedding generation machine learning model (e.g., an encoder machine learning model) to generate a first embedding, the second representation is processed by the embedding generation machine learning model to generate a second embedding, the two embeddings are mapped to an embedding space, and a magnitude of a vector between the mappings of the two embeddings in the embedding space is used to determine the similarity value for the corresponding sensor observation pair. In some cases, the similarity value for two sensor observations is determined based on the cosine similarity and/or cosine distance of the respective embeddings for the two sensor observations.

In some cases, the first similarity matrix 112 can be used to determine one or more objects in the vehicle environment. For example, in some cases, the first similarity matrix 112 may be used to determine one or more tracks associated with the environment 108. In some of those cases, a second similarity matrix 222 may be determined that represents similarity values between a set of sensor observations in the environment 108 and the one or more tracks. In some cases, the second similarity matrix 222 is used to detect one or more objects in the environment 108. As another example, in some cases, the first similarity matrix 112 may be used to determine one or more tracks in the environment 108 (e.g., by clustering the sensor observations whose similarity values are represented by the first similarity matrix in accordance with the similarity values), and the tracks may then be used to determine one or more objects in the environment 108.

As further depicted in FIG. 1, the similarity values described by the first similarity matrix 112 may be used to determine or otherwise initialize T tracks 114 associated with the environment 108. In some cases, the N sensor observations 104 are assigned to T tracks, such that each one of the N sensor observations 104 is assigned to one of the T tracks 114. In some cases, assignment of the N sensor observations 104 to the T tracks is determined based on the similarity values in the first similarity matrix 112. In some cases, the N sensor observations 104 are clustered into T clusters based on the similarity values in the first similarity matrix 112, and then the T sensor observation clusters are adopted as the T tracks 114.

In some cases, to initialize the T tracks 114 based on the N sensor observations 104, N tracks are first initialized. In some of those cases, the N sensor observations 104 are then assigned to a first subset of the N initialized tracks (e.g., by clustering the N sensor observations 104 in accordance with a clustering technique). The first subset may represent a subset of the initialized tracks that includes each initialized track to which at least one of the N sensor observations 104 has been assigned. The first subset may include all or some of the N initialized tracks. In some cases, T represents the number of tracks in the first subset, which may be less than or equal to N. In some cases, the T tracks 114 include the tracks in the first subset.

In some cases, the T tracks 114 represent T objects detected in the environment 108. For example, in some cases, the T tracks 114 are determined based on the first similarity matrix 112 that is in turn determined based on the sensor data of the environment 108 at a first time. Accordingly, in some of those cases, the T tracks represent T objects detected in the environment 108 at the first time. In some of cases, the T objects and/or feature data (e.g., position data, speed data, acceleration data, predicted trajectory data, and/or the like) associated with the T objects are used to update the environment model 134.

FIG. 2 illustrates an example architecture 200 for updating the environment model 134 of FIG. 1 using a second similarity matrix 222 of FIG. 1. The architecture 200 can be used to perform a process determine a set of S tracks for a current time (e.g., iteration) using V tracks determined in a previous time and M sensor observations associated with (e.g., obtained in) the current time. For example, if the described process is performed in the second time, the process may determine a set of tracks for the second time based on the T tracks 114 initialized using the initialization process performed by the architecture 100 of FIG. 1 and a set of sensor observations associated with the second time. As another example, if the described process is performed in a third time, the process may determine a set of tracks for the second time based on the set of tracks determined for the second time and a set of M sensor observations associated with the third time. Accordingly, the architecture 200 of FIG. 2 may be used to perform an iterative process for determining a new set of tracks based on a set of previously-determined tracks and a set of newly-obtained sensor observations.

As depicted in FIG. 2, a second similarity matrix 222 may be determined that represents similarity values for the V tracks of a previous time and M sensor observations of the environment 108 that are associated with a current time. Exemplary techniques for determining the second similarity matrix 222 are described below with reference to FIG. 4.

In some cases, when M sensor observations and V tracks are associated with the second similarity matrix 222, the second similarity matrix 222 includes M×V similarity values, with each similarity value representing a predicted measure of correspondence for a respective sensor observation from the M sensor observations and a respective track from the V tracks. In the operational example of FIG. 1, a similarity value for an ath track and a bth sensor observation is denoted as $V_{a,b}$.

In some cases, a similarity value described by the second similarity matrix 222 may represent a predicted measure of correspondence for a respective track and a respective sensor observation. For example, the similarity value for a track and a sensor observation may be determined based on a prediction about whether the sensor observation includes an object that is associated with the track. In some cases, the similarity value is determined based on a distance between a first embedding that is associated with the track and a second embedding that is associated with the sensor observation. In some cases, the track includes a set of sensor observations (e.g., a cluster of past sensor observations) that have been clustered together (e.g., based on similarity values for pairs of sensor observations as described by the first similarity matrix). In some of those cases, the first embedding for a track is determined based on a point in an embedding space that describes a position of the corresponding cluster that is associated with the track, such as a centroid point of the cluster. In some cases, the second embedding is determined by processing the sensor observation using an embedding generation machine learning model. In some cases, the distance between the first embedding and the second embedding is determined based on a magnitude of a vector between a mapping of the first embedding in an embedding space and a mapping of the second embedding in the embedding space.

In some cases, when M sensor observations and V tracks are associated with the second similarity matrix 222, the second similarity matrix 222 includes V occlusion values. Each occlusion value may be associated with a respective track of the V tracks and may represent whether the respective track is determined to correspond to at least one of the M sensor observations. In some cases, a track is determined to correspond to a sensor observation if the similarity value for the track and the sensor observation (e.g., as described by the second similarity matrix 222) exceeds a threshold. In some cases, if a track is determined to not correspond to any of the M sensor observations, the track is assigned a first occlusion value (e.g., an occlusion value of zero) that may represent that the track is not in the environment 108 at a time associated with the M sensor observations. In some cases, if a track is determined to correspond to at least one of the M sensor observations, the track is assigned a second occlusion value (e.g., an occlusion value of one) that may represent that the track is in the vehicle environment at a time associated with the M sensor observations. In some of those cases, the V occlusion values are included in a particular column (e.g., the last column) or a particular row (e.g., the last row) of the second similarity matrix 222. In the operational example of FIG. 1, an occlusion value for an ath track is denoted as $O_a$ and included in the last column of the second similarity matrix 222. However, a person of ordinary skill in the relevant technology will recognize that occlusion values may be included in other locations within the second similarity matrix 222.

Accordingly, in some cases, the second similarity matrix 222 that is associated with M sensor observations and V tracks includes (M)×(V+1) values, including M×V similarity values and V occlusion values. In some cases, the V occlusion values are determined based on the M×V similarity values and represent whether each of the V tracks correspond to at least one of the M sensor observations. In some cases, if the occlusion value for one of the V tracks represents that the track does not correspond to any of the M sensor observations, then the track is determined to not be present in a time associated with the M sensor observations (e.g., in a second time that follows a first time associated with the first similarity matrix 112).

As further depicted in FIG. 2, the second similarity matrix 222 may be used to determine and/or update an environment model 134 for the environment 108. The environment model 134 may represent an object that is detected in the environment 108 and/or feature data (e.g., position data, speed data, acceleration data, predicted trajectory data, and/or the like) associated with the object. In some cases, the environment model 134 represents a set of objects that are detected in the environment 108 at one or more times and/or feature data associated with those objects. For example, in some cases, the environment model 134 represents data associated with objects detected in a current time and/or in one or more past times.

In some cases, the second similarity matrix 222 can be used to identify each track that is determined to correspond to at least one sensor observation in accordance with the occlusion values of the second similarity matrix. In some of those cases, the environment model 134 may represent a set of objects corresponding to the identified tracks and/or feature data associated with the set of objects.

In some cases, the second similarity matrix 222 can be used to identify a set of unassigned sensor observations that are determined to not correspond to any tracks in accordance with the similarity values of the second similarity matrix 222. In some of those cases, the unassigned sensor observations may be used to determine one or more new tracks (e.g., by clustering the unassigned sensor observations). In some cases, the environment model 134 may represent that a set of objects corresponding to the new tracks is detected in the environment 108 at a time associated with the second similarity matrix 222 (e.g., at a time associated with M sensor observations used to determine the second similarity matrix 222). Exemplary techniques for object detection based on unassigned sensor observations are described below in relation to FIG. 2.

As depicted in FIG. 2, the second similarity matrix 222 may be used to determine L unassigned sensor observations 204 that are determined to not correspond to any of the T tracks 114 associated with the second similarity matrix 222. In some cases, a sensor observation is determined to correspond to a track if the similarity value for the sensor observation and track (e.g., as represented by the second similarity matrix 222) exceeds a threshold. In some cases, if a sensor observation in the M sensor observations associated with the second similarity matrix 222 is determined to not correspond to any of the T tracks associated with the second similarity matrix 222, then the sensor observation is included among the L sensor observations 204.

As further depicted in FIG. 2, the L sensor observations 204 may be used to determine a third similarity matrix 212. In some cases, the third similarity matrix 212 includes L*L similarity values, with each similarity value representing the predicted measure of similarity between a pair of sensor observations from the L sensor observations 204. In some cases, the techniques described above for determining the first similarity matrix 112 based on N sensor observations 104 can be used in relation to L sensor observations 204 to determine the third similarity matrix 212.

As further depicted in FIG. 2, the third similarity matrix 212 may be used to initialize a set of R tracks 214. In some cases, the set of R tracks 214 may be determined based on the similarity values of the third similarity matrix 212. For example, the set of R tracks 214 may be determined based on the similarity values of the third similarity matrix 212 using the techniques described above for determining the set of T tracks 114 based on the similarity values of the first similarity matrix 112.

As further depicted in FIG. 2, the set of R tracks 214 may be used to update the environment model 134, for example by updating the environment model 134 to represent that objects corresponding to the R tracks 214 are detected in the environment 108 at a time associated with the second similarity matrix 222. In some cases, the environment model 134 represents feature data associated with the objects corresponding to the R tracks 214. In some cases, a set of S tracks is determined for the current time that includes the R tracks 214 in addition to a set of Q tracks 216. The set of Q tracks 216 may represent a subset of the V tracks associated with a previous time that are detected in the M sensor observations associated with the current time. For example, the set of Q tracks 216 may include a subset of the V tracks whose occlusion values in the second similarity matrix 222 represented that those tracks were detected in the M sensor observations (e.g., a subset of the V tracks that had non-zero occlusion values). As depicted in FIG. 2, the set of Q tracks are determined based on P sensor observations 206 that were assigned to at least one of the V tracks in accordance with the similarity values represented by the second similarity matrix 222.

In some of those cases, the set of S updated tracks may then be used to determine a fourth similarity matrix that represents similarity values between S updated tracks and a set of sensor observations (e.g., a set of K sensor observations associated with a subsequent time that follows the current time). In some cases, the described process may be repeated across time until a stopping condition is reached (e.g., the vehicle 106 is turned off).

Figure 3:
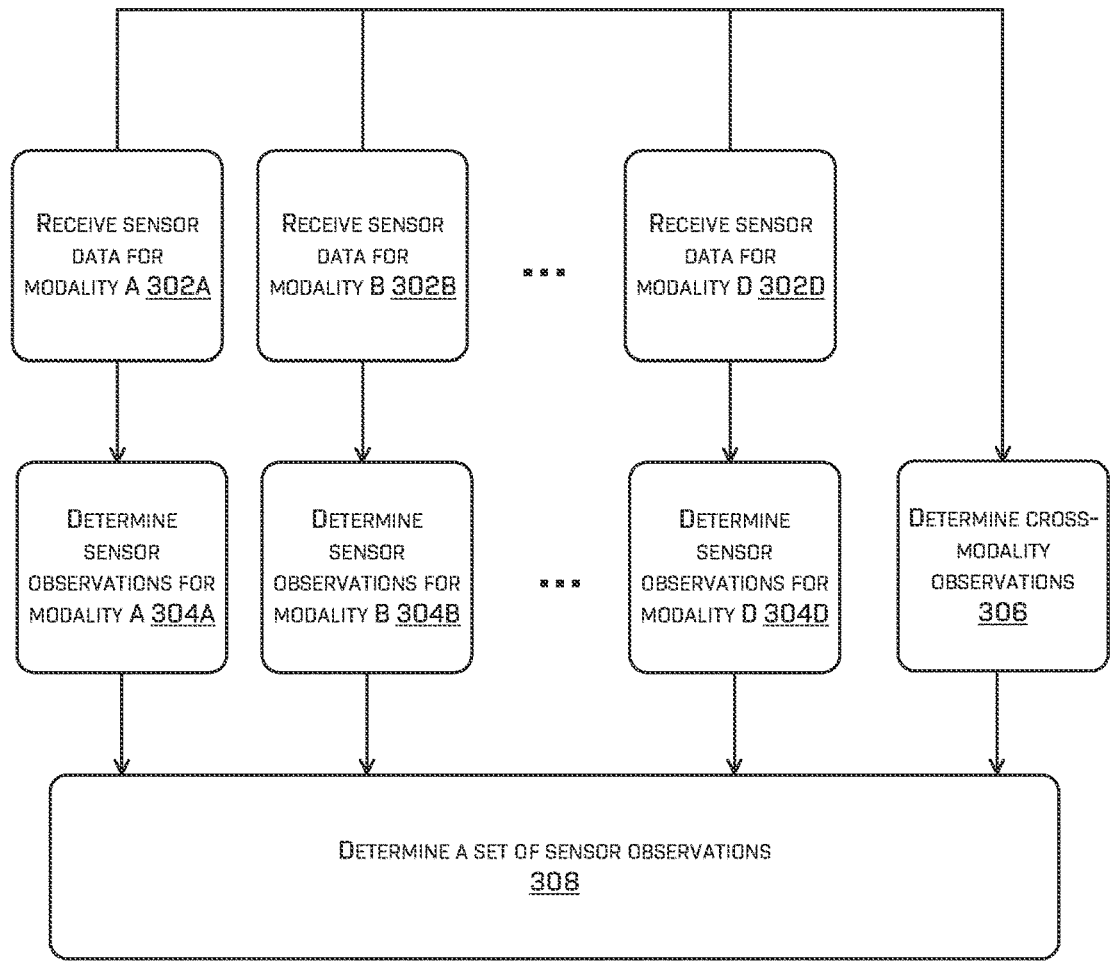
FIG. 3 depicts an example process for determining a set of sensor observations based on sensor data associated with a vehicle environment.

FIG. 3 depicts an example process 300 for determining a set of sensor observations. As depicted in FIG. 3, at operations 302A-302D, the process 300 includes receiving sensor data for a set of sensors associated with D sensor modalities. Examples of sensor modalities include lidar, radar, sonar, and/or an image sensor (e.g., an image sensor including at least one of a visible light spectrum camera, a depth camera, an infrared camera, and/or the like).

At operations 304A-304D, the process 300 includes processing each set of sensor data to determine a set of sensor observations. Accordingly, D sets of sensor observations are determined based on D sets of sensor data associated with D sensor modalities. In some cases, a set of sensor observations that is associated with a corresponding sensor modality may be determined by processing sensor data associated with the corresponding sensor modality using a perception machine learning model that is configured to detect objects in the sensor data of the corresponding sensor data. For example, a lidar point cloud of a vehicle environment may be used to detect a set of objects in the lidar point cloud and generate a set of sensor observations based on the detected objects. As another example, an image of a vehicle environment may be used to detect a set of objects in the environment image and generate a set of sensor observations based on the detected objects.

At operation 306, the process 300 includes determining a set of cross-modality observations based on the sensor data received at operations 302A-302D. A cross-modality observation may be a sensor observation that is determined based on sensor data associated with more than one sensor modality. For example, in some cases, at least two of sensor data captured by a lidar sensor at a first time, sensor data captured by a radar sensor at the first time, sensor data captured by a sonar sensor at the first time, or sensor data captured by an image sensor at the first time may be collectively processed to determine a set of cross-modality observations for the respective vehicle environment. In some cases, a cross-modality observation represents a detection of an object in a vehicle environment in the sensor data associated with two or more sensor modalities. For example, a cross-modality observation may represent a region of lidar data associated with a first time that is predicted to depict a first vehicle and a region of sonar data associated with the first time that is predicted to depict the first vehicle. In some cases, because cross-modality observations are determined using predictive inferences performed across sensor data of various modalities, such cross-modality observations are likely to represent objects that may not have been detected using sensor data of a single modality.

At operation 308, the process 300 includes determining a set of sensor observations based on at least one of the sensor observations determined in operations 304A-304D or the cross-modality observations determined in operation 306. In some cases, the sensor observations determined in operations 304A-304D and the cross-modality observations are combined to generate a final set of sensor observations. The set of sensor observations may then be used to determine a similarity matrix (e.g., the first similarity matrix 112 of FIG. 1) that represents similarity values between sensor observation pairs from the determined set of sensor observations.

Figure 4:
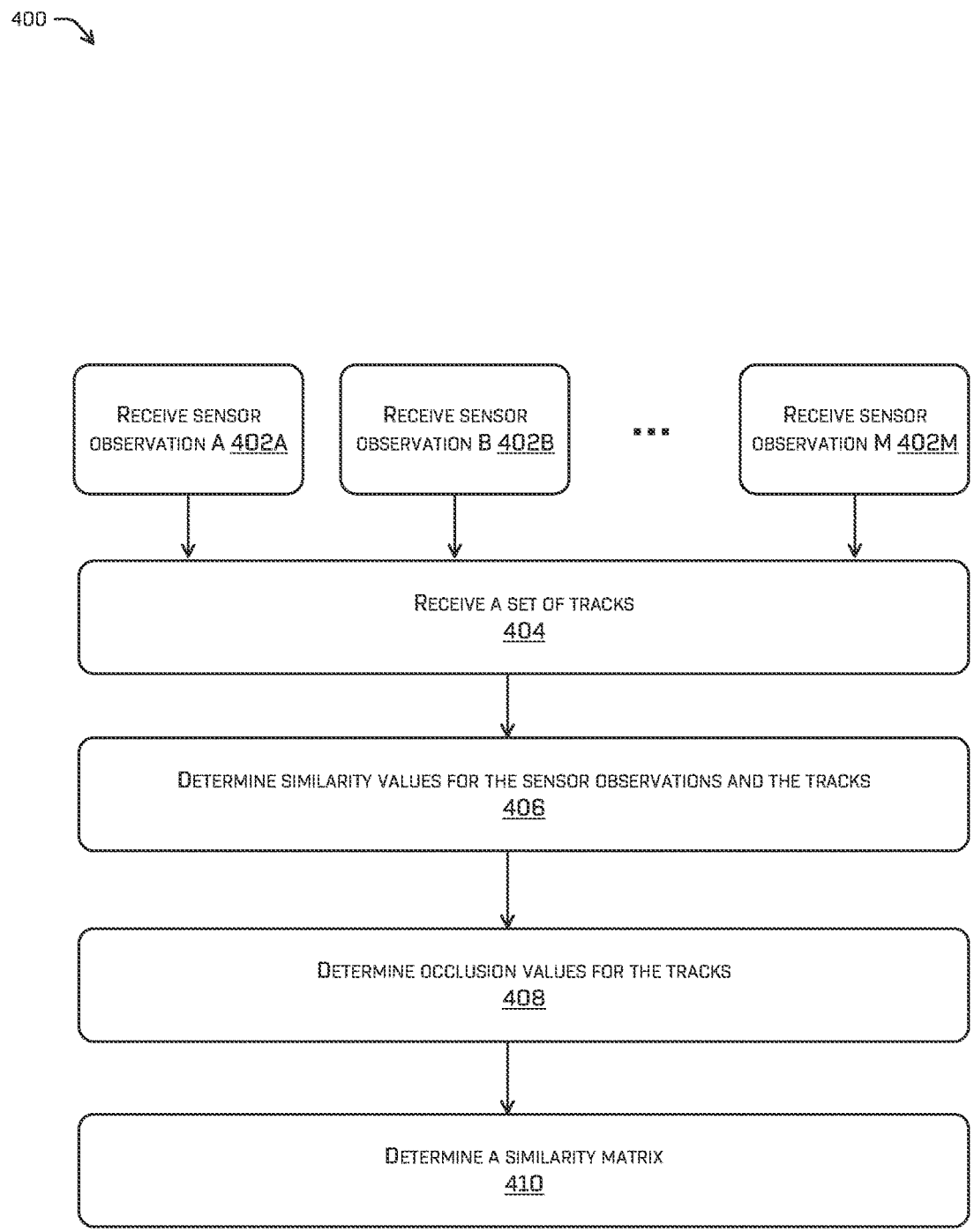
FIG. 4 depicts an example process for determining a similarity matrix that includes similarity values for sensor observations and tracks associated with a vehicle environment.

FIG. 4 depicts an example process 400 for determining a similarity matrix (e.g., the similarity matrix 222 of FIG. 2) that represents a similarity value for a track and a sensor observation. As depicted in FIG. 4, at operations 402A-402M, the process 400 includes receiving M sensor observations. The M sensor observations may be associated with a common time/time (e.g., a second time that is after a first time associated with the sensor data used to determine a first similarity matrix). A sensor observation may represent a detection of at least one object in the vehicle environment in sensor data obtained from one or more sensor modalities.

At operation 404, the process 400 includes receiving a set of tracks. In some cases, a track represents a collection of detections of an object in a vehicle environment across time. In some cases, a track represents feature data associated with a set of detections of an object in a vehicle environment across time. For example, a track may represent all of the detections of a first vehicle that is in an environment of a second vehicle while the first vehicle is in the environment. In some cases, a set of tracks are determined based on similarity values for a set of sensor observations as represented by a first similarity matrix.

At operation 406, the process 400 includes determining similarity values for the sensor observations and the tracks. In some cases, for each observation-track tuple that includes one of the sensor observations received at operations 402A-402M and one of the tracks received at operation 404, a similarity value is determined. In some cases, the similarity value for a track and a sensor observation may be determined based on a prediction about whether the sensor observation includes an object that is associated with the track. In some cases, the similarity value is determined based on a distance between a first embedding that is associated with the track and a second embedding that is associated with the sensor observation. In some cases, the track includes a set of sensor observations (e.g., a cluster of past sensor observations) that have been clustered together (e.g., based on similarity values for pairs of sensor observations as described by the first similarity matrix).

At operation 408, the process 400 includes determining occlusion values for the tracks received at operation 404. In some cases, an occlusion value may be associated with a respective track and may represent whether the respective track is determined to correspond to at least one of the M sensor observations received at operations 402A-402M. In some cases, a track is determined to correspond to a sensor observation if the similarity value for the track and the sensor observation (e.g., as determined in operation 406) exceeds a threshold. In some cases, if a track is determined to not correspond to any of the M sensor observations, the track is assigned a first occlusion value (e.g., an occlusion value of zero) that may represent a determination that the track is not in a corresponding vehicle environment at a time associated with the M sensor observations. In some cases, if a track is determined to correspond to at least one of the M sensor observations, the track is assigned a second occlusion value (e.g., an occlusion value of one) that may represent a determination that the track is in the vehicle environment at a time associated with the M sensor observations.

At operation 410, the process 400 includes determining a similarity matrix (e.g., the similarity matrix 222 of FIGS. 1-2) based on at least one of the similarity values or the occlusion values. In some cases, the similarity values determined at operation 404 and the occlusion values determined at operation 406 are combined to determine the similarity matrix.

Figure 5:
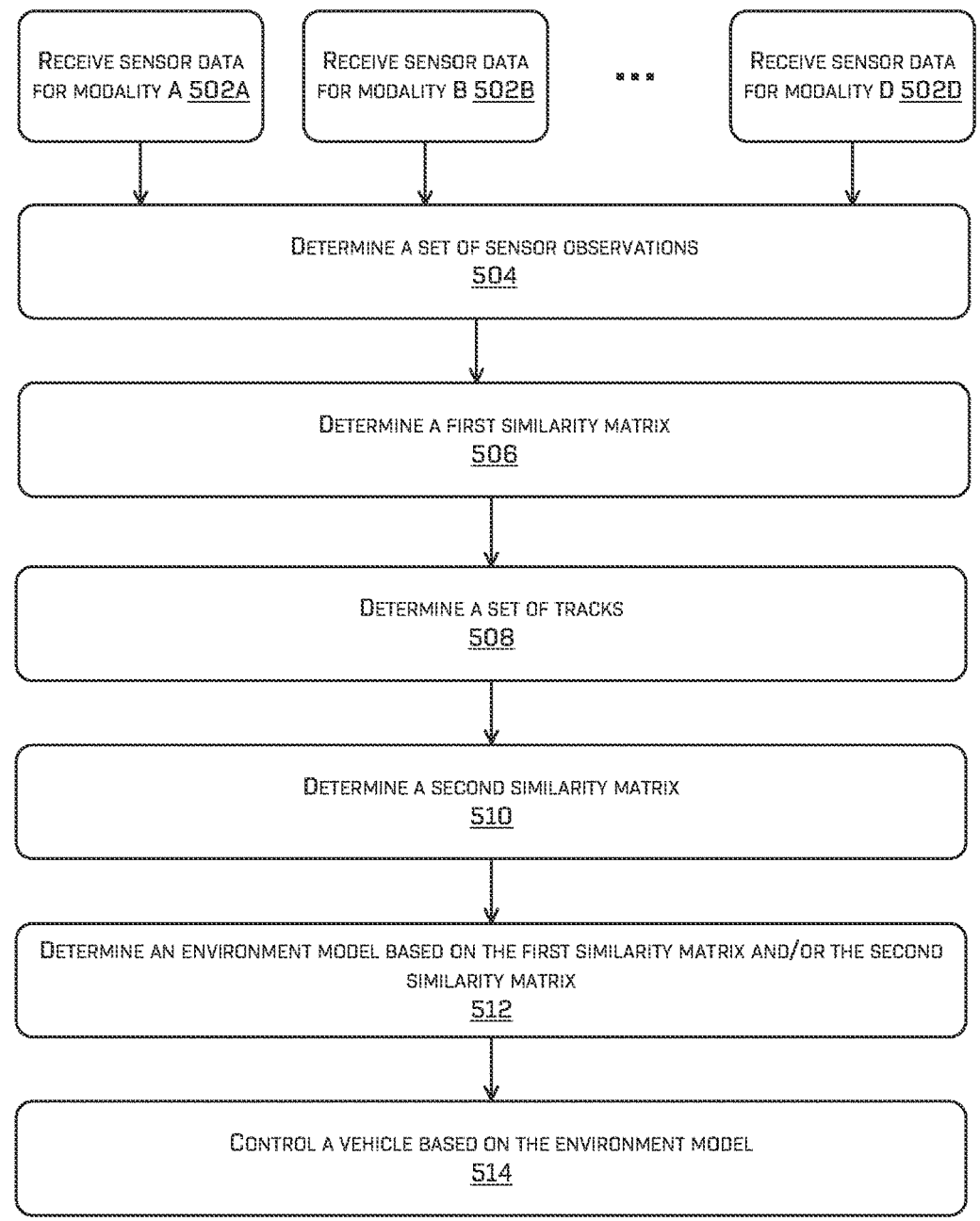
FIG. 5 depicts an example process for controlling a vehicle based on sensor data associated with various sensor modalities.

FIG. 5 depicts an example process 500 for controlling a vehicle (e.g., an autonomous vehicle) based on sensor data received from a set of sensors associated with S sensor modalities. As depicted in FIG. 5, at operations 502A-502D, the process 500 includes receiving sensor data for a set of sensors associated with D sensor modalities. Examples of sensor modalities include lidar, radar, sonar, and/or an image sensor (e.g., an image sensor including at least one of a visible light spectrum camera, a depth camera, an infrared camera, and/or the like).

At operation 504, the process 500 includes determining a set of sensor observations based on the sensor data received at operations 502A-502D. In some cases, sensor observations include at least one of the following: one or more single-modality observations or one or more cross-modality observations. A single-modality observation may be a sensor observation that is determined based on sensor data associated with a single sensor modality, for example by detecting an object in a region of the sensor data associated with the single sensor modality. A cross-modality observation may be a sensor observation that is determined based on sensor data associated with more than one sensor modality. In some cases, given a set of sensor modalities associated with the sensors of a vehicle, the sensor data captured by at least two (e.g., all) of the described sensor modalities at a first time may be collectively processed by a machine learning model (e.g., a deep tracking network machine learning model) to determine a set of cross-modality observations for the respective vehicle environment.

At operation 506, the process 500 includes determining a first similarity matrix. In some cases, after a set of sensor observations associated with a vehicle environment are received and/or determined, the set of sensors observations may be used to determine the first similarity matrix. In some cases, the first similarity matrix may represent a first similarity value that represents a predicted measure of similarity between a first sensor observation and a second sensor observation associated with a vehicle environment. In some cases, given a set of N sensor observations determined at operation 504, the first similarity matrix represents N×N similarity values, with each similarity value being associated with a pair of sensor observations from the set of N sensor observations and representing a predicted measure of similarity of the pair.

At operation 508, the process 500 includes determining or otherwise initializing a set of tracks based on the first similarity matrix. In some cases, the sensor observations are assigned to a set of tracks, such that each one of the sensor observations is assigned to one of the tracks. In some cases, assignment of the sensor observations to the tracks is determined based on the similarity values in the first similarity matrix. In some cases, the sensor observations are clustered into clusters based on the similarity values in the first similarity matrix, and then the set of sensor observation clusters are adopted as the set of tracks. In some cases, given N sensor observations, at first N tracks are initialized, then the N sensor observations are assigned to at least a first subset of the initialized N tracks (e.g., each sensor observation is assigned to an initialized track) based on the similarity values in the first similarity matrix, and then the tracks are determined based on the described assignment.

At operation 510, the process 500 includes determining a second similarity matrix. In some cases, the second similarity matrix is associated with M sensor observations and T tracks (e.g., the tracks determined at operation 508). The M sensor observations may include at least one of the sensor observations determined at operation 504 based on the sensor data received at operations 502A-502D or sensor observations determined based on sensor data associated with a subsequent time. In some cases, given M sensor observations and T tracks associated with a vehicle environment, the second similarity matrix for the vehicle environment includes M×T similarity values, with each similarity value representing a predicted measure of correspondence between a corresponding sensor observation from the M sensor observations and a corresponding track from the T tracks. A predicted measure of correspondence may represent a predicted likelihood that a track and a sensor observation are associated with a common object. In some cases, given M sensor observations and T tracks associated with a vehicle environment, the second similarity matrix includes T occlusion values, with each occlusion value representing whether a corresponding track in the T tracks is determined to correspond to at least one of the M sensor observations. Accordingly, in some cases, the second similarity matrix includes (M)×(T+1) values including M×T similarity values and T occlusion values.

At operation 512, the process 500 includes determining an environment model for the vehicle environment based on at least one of the first similarity matrix or the second similarity matrix. In some cases, the environment model includes data associated with one or more objects that are detected in the vehicle environment. In some of those cases, the objects detected in the vehicle environment include the objects corresponding to the set of tracks determined in operation 508. In some cases, the objects detected in the vehicle environment include objects corresponding to a subset of the set of tracks determined in operation 508 that are determined to correspond to at least one sensor observation in accordance with the occlusion values of the second similarity matrix.

At operation 514, the process 500 includes controlling the vehicle based on the environment model. In some cases, after an object is detected in the vehicle environment, a predicted trajectory is determined for the object, for example by using a prediction machine learning model. In some cases, after determining predicted trajectories for a set of detected objects in the vehicle environment, a recommended trajectory for the vehicle is determined in accordance with the predicted object trajectories, and the vehicle is controlled in accordance with the recommended trajectory. In some cases, the recommended trajectory for the vehicle is determined in a manner that is expected to increase the likelihood that the vehicle is operated in compliance with relevant traffic regulations and avoids collision with other objects in the vehicle environment.

Figure 6:
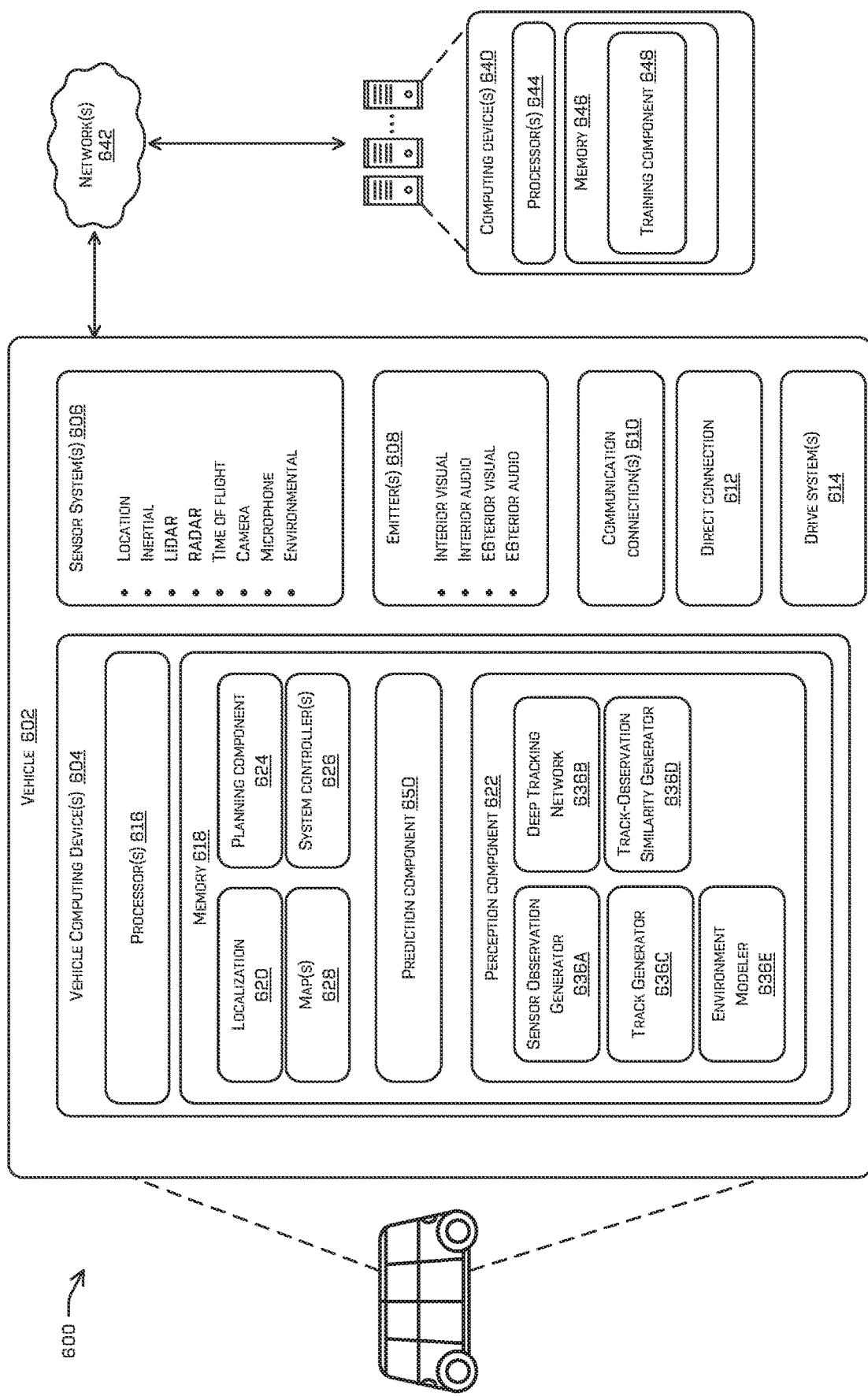
FIG. 6 depicts a block diagram of an example system for implementing the techniques described herein.

FIG. 6 depicts a block diagram of an example system 600 for implementing the techniques described herein. In at least one example, the system 600 may include a vehicle 602.

The vehicle 602 may include a vehicle computing device 604, one or more sensor systems 606, one or more emitters 608, one or more communication connections 610, at least one direct connection 612, and one or more drive systems 614.

The vehicle computing device 604 may include one or more processors 616 and memory 618 communicatively coupled with the one or more processors 616. In the illustrated example, the vehicle 602 is an autonomous vehicle; however, the vehicle 602 could be any other type of vehicle. In the illustrated example, the memory 618 of the vehicle computing device 604 stores a localization component 620, a perception component 622, a planning component 624, a prediction component 650, one or more system controllers 626, and one or more maps 628. Though depicted in FIG. 6 as residing in memory 618 for illustrative purposes, it is contemplated that the localization component 620, the perception component 622, the planning component 624, the prediction component 650, the one or more system controllers 626, and the one or more maps 628 may additionally, or alternatively, be accessible to the vehicle 602 (e.g., stored remotely).

In at least one example, the localization component 620 may include functionality to receive data from the sensor system(s) 606 to determine a position of the vehicle 602. For example, the localization component 620 may include and/or request/receive a three-dimensional map of an environment and may continuously determine a location of the autonomous vehicle within the map. In some instances, the localization component 620 may utilize SLAM (simultaneous localization and mapping) or CLAMS (calibration, localization and mapping, simultaneously) to receive image data, lidar data, radar data, IMU data, GPS data, wheel encoder data, and the like to accurately determine a location of the autonomous vehicle. In some instances, the localization component 620 may provide data to various components of the vehicle 602 to determine an initial position of an autonomous vehicle for generating a candidate trajectory.

In some instances, the perception component 622 may include functionality to perform object detection, segmentation, and/or classification. In some examples, the perception component 622 may provide processed sensor data that indicates a presence of an entity that is proximate to the vehicle 602 and/or a classification of the entity as an entity type (e.g., car, pedestrian, cyclist, building, tree, road surface, curb, sidewalk, unknown, road feature, etc.). In examples, the perception component 622 may process sensor data to identify a road feature (e.g., an intersection, parking lane, signal light, stop sign, etc.), determine a proximity of the road feature to the vehicle 602, and/or provide data regarding the road feature (e.g., proximity, etc.) as processed sensor data. In additional and/or alternative examples, the perception component 622 may provide processed sensor data that indicates one or more characteristics associated with a detected entity and/or the environment in which the entity is positioned. In some examples, characteristics associated with an entity may include, but are not limited to, an x-position, a y-position, a z-position, an orientation, an entity type (e.g., a classification), a velocity of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

In examples, the perception component 636 includes a sensor observation generator 636A that is configured to generate a single-modality sensor observation (e.g., a sensor observation that is determined based on sensor data associated with a single sensor modality). In examples, the perception component 636 includes a deep tracking network 636B that is configured to generate a cross-modality sensor observations (e.g., a sensor observation that is determined based on sensor data associated with more than one sensor observation).

In examples, the perception component 622 includes a track generator 636C that is configured to determine a similarity matrix (e.g., the first similarity matrix 112 of FIG. 1 and/or the third similarity matrix 212 of FIG. 2) that represents similarity values for sensor observation pairs (e.g., sensor observation pairs determined based on sensor observations generated by the sensor observation generator 636A and/or sensor observations generated by the deep tracking network 636B).

In examples, the perception component 622 includes an observation-track similarity generator 636D that is configured to generate a similarity value for a sensor observation and a track. The perception component 622 may be used to determine a similarity matrix (e.g., the second similarity matrix 222 of FIGS. 1-2) that includes similarity values associated with sensor observations and tracks of a vehicle environment.

In examples, the perception component 622 includes an environment modeler 636E that is configured to generate a model of a vehicle environment based on object detections in the environment. The environment model may represent an object detected in the environment and/or one or more features associated with the object. The environment model may be generated based on a track that is determined by the track generator and/or a similarity value that is determined by the observation-track similarity generator 636D.

In examples, the planning component 624 may determine a path for the vehicle 602 to follow to traverse through an environment. For example, the planning component 624 may determine various routes and trajectories and various levels of detail. For example, the planning component 624 may determine a route to travel from a first location (e.g., a current location) to a second location (e.g., a target location). For the purpose of this discussion, a route may be a sequence of waypoints for travelling between two locations. As non-limiting examples, waypoints include streets, intersections, GPS coordinates, etc. Further, the planning component 624 may generate an instruction for guiding the autonomous vehicle along at least a portion of the route from the first location to the second location. In at least one example, the planning component 624 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique.

In examples, the prediction component 650 may include functionality to determine a prediction about the vehicle environment (e.g., the prediction 162 of FIG. 1), for example a prediction about the trajectory of another vehicle in the environment. In some cases, the prediction component 650 generates a recommended trajectory for the vehicle 602 based on the predicted trajectories of objects in the vehicle environment.

In at least one example, the one or more system controllers 626 may be configured to control steering, propulsion, braking, safety, emitters, communication, and other systems of the vehicle 602. The system controller(s) 626 may communicate with and/or control corresponding systems of the drive system(s) 614 and/or other components of the vehicle 602.

The memory 618 may further include the one or more maps 628 that may be used by the vehicle 602 to navigate within the environment. For example, a map may be any number of data structures modeled in two dimensions or three dimensions that are capable of providing information about an environment, such as, but not limited to, topologies (such as intersections), streets, mountain ranges, roads, terrain, and the environment in general. In one example, a map may include a three-dimensional mesh. In some instances, the map may be stored in a tiled format, such that individual tiles of the map represent a discrete portion of an environment, and may be loaded into working memory as needed. In some instances, the map(s) 628 may be divided into tiles by the vehicle computing device 604, by a computing device(s) 640, or by a combination of the two.

In some examples, the one or more maps 628 may be stored on a remote computing device(s) (such as the computing device(s) 640) accessible via network(s) 642. In some examples, multiple maps 628 may be stored based on, for example, a characteristic (e.g., type of entity, time of day, day of week, season of the year, etc.). Storing multiple maps 628 may have similar memory requirements, but increase the speed at which data in a heat map may be accessed.

In some instances, aspects of some or all of the components discussed herein may include any models, algorithms, and/or machine learning algorithms. For example, in some instances, the components in the memory 618 may be implemented as a neural network.

As described herein, an exemplary neural network passes input data through a series of connected layers to produce an output. Each layer in a neural network may also include another neural network, or may include any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

In at least one example, the sensor system(s) 606 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 606 may include multiple instances of each of these or other types of sensors. For instance, the lidar sensors may include individual lidar sensors located at the corners, front, back, sides, and/or top of the vehicle 602. As another example, the camera sensors may include multiple cameras disposed at various locations about the exterior and/or interior of the vehicle 602. The sensor system(s) 606 may provide input to the vehicle computing device 604. Additionally, and/or alternatively, the sensor system(s) 606 may send sensor data, via the one or more networks 642, to the one or more computing device(s) 640 at a particular frequency, after a lapse of a predetermined period of time, in near real-time, etc.

The vehicle 602 may also include the one or more emitters 608 for emitting light and/or sound, as described above. The emitters 608 in this example include interior audio and visual emitters to communicate with passengers of the vehicle 602. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may include acoustic beam steering technology.

The vehicle 602 may also include the one or more communication connection(s) 610 that enable communication between the vehicle 602 and one or more other local or remote computing device(s). For instance, the communication connection(s) 610 may facilitate communication with other local computing device(s) on the vehicle 602 and/or the drive system(s) 614. Also, the communication connection(s) 610 may allow the vehicle to communicate with other nearby computing device(s) (e.g., other nearby vehicles, traffic signals, etc.). The communication connection(s) 610 also enable the vehicle 602 to communicate with a remote teleoperations computing device or other remote services.

The communications connection(s) 610 may include physical and/or logical interfaces for connecting the vehicle computing device 604 to another computing device or a network, such as the network(s) 642. For example, the communications connection(s) 610 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 may include the one or more drive systems 614. In some examples, the vehicle 602 may have a single drive system 614. In at least one example, if the vehicle 602 has multiple drive systems 614, individual drive systems 614 may be positioned on opposite ends of the vehicle 602 (e.g., the front and the rear, etc.). In at least one example, the drive system(s) 614 may include one or more sensor systems to detect conditions of the drive system(s) 614 and/or the surroundings of the vehicle 602. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 614. In some cases, the sensor system(s) on the drive system(s) 614 may overlap or supplement corresponding systems of the vehicle 602 (e.g., sensor system(s) 606).

The drive system(s) 614 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 614. Furthermore, the drive system(s) 614 also include one or more communication connection(s) that enable communication by the respective drive module with one or more other local or remote computing device(s).

In at least one example, the localization component 620, perception component 622, and/or the planning component 624 may process sensor data, as described above, and may send their respective outputs, over the one or more network(s) 642, to the one or more computing device(s) 640. In at least one example, the localization component 620, the perception component 622, and/or the planning component 624 may send their respective outputs to the one or more computing device(s) 640 at a particular frequency, after a lapse of a predetermined period of time, in near real-time, etc.

The vehicle 602 may send sensor data to the one or more computing device(s) 640, via the network(s) 642. In some examples, the vehicle 602 may send raw sensor data to the computing device(s) 640. In other examples, the vehicle 602 may send processed sensor data and/or representations of sensor data to the computing device(s) 640. In some examples, the vehicle 602 may send sensor data to the computing device(s) 640 at a particular frequency, after a lapse of a predetermined period of time, in near real-time, etc. In some cases, the vehicle 602 may send sensor data (raw or processed) to the computing device(s) 640 as one or more log files. The computing device(s) 640 may receive the sensor data (raw or processed) and may generate and/or update maps based on the sensor data.

In examples, the vehicle 602 may generate various log file(s) representing sensor data captured by the vehicle 602. For example, a log file may include, but is not limited to, sensor data captured by one or more sensors of the vehicle 602 (e.g., lidar sensors, radar sensors, sonar sensors, wheel encoders, inertial measurement units (IMUs) (which may include gyroscopes, magnetometers, accelerometers, etc.), GPS sensors, image sensors, and the like), route information, localization information, and the like. In some cases, a log file(s) may include a log of all sensor data captured by the vehicle 602, decisions made by the vehicle 602, determinations made regarding segmentation and/or classification, and the like. A log files(s) may be sent to and received by the computing device(s) 640.

In at least one example, the computing device(s) 640 may include one or more processors 644 and memory 646 communicatively coupled with the one or more processors 644. In the illustrated example, the memory 646 stores a training component 648 that may train one or more machine learning models used by the vehicle computing device 604. The training component 648 may train the machine learning models at any time, such as while offline, and then send the machine learning models to the vehicle 602 over the network(s) 642 to be implemented by the vehicle 602. In some cases, once trained, the machine learning models are deployed on the vehicle computing device 604, and operations of machine learning models are performed by the vehicle computing device 604. In some cases, once trained, the machine learning models are deployed on the computing device 640, operations of the machine learning models are performed by the computing device 640 to generate predictions, and then predictions are transmitted to the prediction component 650 of the vehicle computing device 604.

Although illustrated as being implemented on the computing device(s) 640, the training component 648 may be implemented on the vehicle 602, such as stored within the memory 618 of the vehicle computing device 604 and executed by the processor(s) 616 of the vehicle computing device 604. Further, any of the components of the vehicle computing device(s) 604 may alternatively, or additionally, be implemented by the computing device(s) 640.

The processor(s) 616 of the vehicle 602 and the processor(s) 644 of the computing device(s) 640 may be any suitable processor capable of executing instructions to process data and perform operations as described herein. By way of example and not limitation, the processor(s) 616 and 644 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 618 and memory 646 are examples of non-transitory computer-readable media. Memory 618 and memory 646 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 6 is illustrated as a distributed system, in alternative examples, components of the vehicle 602 may be associated with the computing device(s) 640 and/or components of the computing device(s) 640 may be associated with the vehicle 602. That is, the vehicle 602 may perform one or more of the functions associated with the computing device(s) 640, and vice versa.

Conclusion

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood that components or steps discussed with respect to one example or implementation may be used in conjunction with components or steps of other examples. For example, the components and instructions of FIG. 6 may utilize the processes and flows of FIGS. 1-5.

A non-limiting list of objects may include obstacles in an environment, including but not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders and/or steps may be omitted. Additionally, various computations that are herein need not be performed in the order disclosed, and other examples using alternative orderings of the computations could be readily implemented. In addition to being reordered, the computations could also be decomposed into sub-computations with the same results.

Example Clauses

While the example clauses described below are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

A: A system comprising: one or more processors; and one or more non-transitory computer-readable media storing computer-executable instructions that, when executed, cause the one or more processors to perform operations comprising: receiving a first sensor observation based on first sensor data representing an environment of an autonomous vehicle; receiving a second sensor observation based on second sensor data representing the environment, wherein the first sensor observation and the second sensor observation represent an object in the environment; determining a first similarity value based on the first sensor observation, the second sensor observation, and a machine learning model; determining, based on the first similarity value, a first similarity matrix; determining, based on the first similarity matrix, a track associated with the object in the environment; determining a second similarity matrix that represents, for a third sensor observation and the track, a second similarity value; and controlling the autonomous vehicle based on the second similarity matrix.

B: The system of paragraph A, wherein the first similarity value is determined based on a distance between a first embedding of the first sensor observation and a second embedding of the second sensor observation in an embedding space.

C: The system of paragraph A or B, wherein determining the track comprises: initializing a number of tracks in the environment; assigning sensor observations to individual tracks based on the first similarity matrix; and determining the track based on an assignment of the individual tracks.

D: The system of any of paragraphs A-C, wherein the second similarity matrix represents a fourth sensor observation that is not assigned to any individual tracks.

E: The system of any of paragraphs A-D, wherein: the first similarity matrix represents first similarity scores between individual observations of a plurality of sensor observations, and the second similarity matrix represents second similarity scores between the individual observations and individual tracks.

F: One or more non-transitory computer-readable media storing instructions executable by one or more processors, wherein the instructions, when executed, cause the one or more processors to perform operations comprising: receiving a first sensor observation based on first sensor data representing an environment of a vehicle; receiving a second sensor observation based on second sensor data representing the environment, wherein the first sensor observation and the second sensor observation represent an object in the environment; determining, based on a machine learning model, a first similarity value based on the first sensor observation and the second sensor observation; determining, based on the first similarity value, a first similarity matrix; determining a track associated with the environment based on the first similarity matrix, wherein the track represents the object; and controlling the vehicle based on the track.

G: The one or more non-transitory computer-readable media of paragraph F, wherein the first similarity value is determined based on a distance between a first embedding of the first sensor observation and a second embedding of the second sensor observation in an embedding space.

H: The one or more non-transitory computer-readable media of paragraph F or G, wherein determining the track based on the first similarity matrix comprises: determining that the track is associated with the environment at a previous time; determining a second similarity matrix that represents, for a third sensor observation and the track, a second similarity value; and determining that the track is associated with the environment based on the second similarity matrix.

I: The one or more non-transitory computer-readable media of paragraph H, wherein determining that the track is associated with the environment at the previous time comprises: initializing a number of tracks in the environment; assigning sensor observations associated with the previous time to individual tracks based on the first similarity matrix; and determining the track based on an assignment of the individual tracks.

J: The one or more non-transitory computer-readable media of any of paragraphs F-I, wherein the first sensor observation and the second sensor observation are determined to not be associated with any individual tracks.

K: The one or more non-transitory computer-readable media of any of paragraphs F-J, wherein determining that the first sensor observation is not associated with any individual tracks comprises: determining a second similarity matrix that represents, for the first sensor observation and a second track, a third similarity value, wherein the second track is determined based on sensor observation data associated with a previous time; and determining, based on the second similarity matrix, that the first sensor observation is not associated with any individual tracks.

L: The one or more non-transitory computer-readable media of any of paragraphs F-K, wherein the first sensor observation comprises at least one of a lidar-based observation determined based on lidar data, a radar-based observation determined based on radar data, a sonar-based observation determined based on sonar data, an image-based observation determined based on image data, or one or more observations determined by detecting correlations across the lidar data, the radar data, the image data, and the sonar data.

M: The one or more non-transitory computer-readable media of any of paragraphs F-L, wherein the machine learning model comprises at least one of an attention-based mechanism, a convolutional mechanism, or a multi-scale mechanism.

N: The one or more non-transitory computer-readable media of paragraph M, wherein controlling the vehicle further based on the track comprises: determining a predicted trajectory for the object based on the track; and controlling the vehicle further based on the predicted trajectory.

O: A method comprising: receiving a first sensor observation based on first sensor data representing an environment of a vehicle; receiving a second sensor observation based on second sensor data representing the environment, wherein the first sensor observation and the second sensor observation represent an object in the environment; determining, based on a machine learning model, a first similarity value based on the first sensor observation and the second sensor observation; determining, based on the first similarity value, a first similarity matrix; determining a track associated with the environment based on the first similarity matrix, wherein the track represents the object; and controlling the vehicle based on the first similarity matrix.

P: The method of paragraph O, wherein the first similarity value is determined based on a distance between a first embedding of the first sensor observation and a second embedding of the second sensor observation in an embedding space.

Q: The method of paragraph O or P, wherein determining the track based on the first similarity matrix comprises: determining that the track is associated with the environment at a previous time; determining a second similarity matrix that represents, for a third sensor observation and the track, a second similarity value; and determining that the track is associated with the environment based on the second similarity matrix.

R: The method of paragraph Q, wherein determining that the track is associated with the environment at the previous time comprises: initializing a number of tracks in the environment; assigning sensor observations associated with the previous time to individual tracks based on the first similarity matrix; and determining the track based on an assignment of the individual tracks.

S: The method of paragraph R, wherein the first sensor observation and the second sensor observation are determined to not be associated with any individual tracks.

T: The method of any of paragraphs O-S, wherein determining that the first sensor observation is not associated with any individual tracks comprises: determining a second similarity matrix that represents, for the first sensor observation and a second track, a third similarity value, wherein the second track is determined based on sensor observation data associated with a previous time; and determining, based on the second similarity matrix, that the first sensor observation is not associated with any individual tracks.

The invention claimed is:

1. A system comprising:
one or more processors; and
one or more non-transitory computer-readable media storing computer-executable instructions that, when executed, cause the one or more processors to perform operations comprising:
receiving a first sensor observation based on first sensor data representing an environment of an autonomous vehicle;
receiving a second sensor observation based on second sensor data representing the environment, wherein the first sensor observation and the second sensor observation represent an object in the environment;
determining a first similarity matrix based on the first sensor observation, the second sensor observation, and a machine learning model, wherein the first similarity matrix includes a first similarity value, and wherein the first similarity value represents a first similarity of the first sensor observation and the second sensor observation;
determining, based on the first similarity matrix, a track associated with the object in the environment;
determining a second similarity matrix that includes a second similarity value, wherein the second similarity value represents a second similarity of a third sensor observation and the track; and
controlling the autonomous vehicle based on the second similarity matrix.

2. The system of claim 1, wherein the first similarity value is determined based on a distance between a first embedding of the first sensor observation and a second embedding of the second sensor observation in an embedding space.

3. The system of claim 1, wherein the first similarity matrix is associated with a set of sensor observations comprising the first sensor observation and the second sensor observation, and determining the track comprises:
determining a set of initial of tracks in the environment; and
assigning the set of sensor observations to the set of initial tracks based on the first similarity matrix.

4. The system of claim 1, wherein the second similarity matrix is associated with a set of tracks comprising the track and a set of sensor observations comprising the third sensor observation and a fourth sensor observation, and the operations further comprise:

determining, based on the second similarity matrix represents, that the fourth sensor observation is not assigned to any of the set of tracks.

5. The system of claim 1, wherein:
the first similarity matrix represents first similarity scores between individual observations of a plurality of sensor observations, and
the second similarity matrix represents second similarity scores between the individual observations and individual tracks.

6. One or more non-transitory computer-readable media storing instructions executable by one or more processors, wherein the instructions, when executed, cause the one or more processors to perform operations comprising:
receiving a first sensor observation based on first sensor data representing an environment of a vehicle;
receiving a second sensor observation based on second sensor data representing the environment, wherein the first sensor observation and the second sensor observation represent an object in the environment;
determining, based on a machine learning model, a first similarity matrix including a first similarity value, wherein the first similarity value represents a first similarity of the first sensor observation and the second sensor observation;
determining a track associated with the environment based on the first similarity matrix, wherein the track represents the object;
determining a second similarity matrix that includes a second similarity value, wherein the second similarity value represents a second similarity of a third sensor observation and the track; and
controlling the vehicle based on the second similarity matrix.

7. The one or more non-transitory computer-readable media of claim 6, wherein the first similarity value is determined based on a distance between a first embedding of the first sensor observation and a second embedding of the second sensor observation in an embedding space.

8. The one or more non-transitory computer-readable media of claim 6, wherein determining the track based on the first similarity matrix comprises:
determining that the track is associated with the environment at a previous time.

9. The one or more non-transitory computer-readable media of claim 8, wherein the first similarity matrix is associated with a set of sensor observations comprising the first sensor observation and the second sensor observation, and wherein determining that the track is associated with the environment at the previous time comprises:
determining a set of initial tracks in the environment; and
assigning the set of sensor observations to the set of initial tracks based on the first similarity matrix.

10. The one or more non-transitory computer-readable media of claim 6, wherein the first sensor observation and the second sensor observation are determined to not be associated with any individual tracks.

11. The one or more non-transitory computer-readable media of claim 10, wherein determining that the first sensor observation is not associated with any individual tracks comprises:
determining that the second similarity matrix represents, for the first sensor observation and a second track, a third similarity value, wherein the second track is determined based on sensor observation data associated with a previous time; and
determining, based on the third similarity value, that the first sensor observation is not associated with any individual tracks.

12. The one or more non-transitory computer-readable media of claim 6, wherein the first sensor observation comprises at least one of:
a lidar-based observation determined based on lidar data,
a radar-based observation determined based on radar data,
a sonar-based observation determined based on sonar data,
an image-based observation determined based on image data, or
one or more observations determined by detecting correlations across the lidar data, the radar data, the image data, and the sonar data.

13. The one or more non-transitory computer-readable media of claim 6, wherein the machine learning model comprises at least one of an attention-based mechanism, a convolutional mechanism, or a multi-scale mechanism.

14. The one or more non-transitory computer-readable media of claim 13, wherein controlling the vehicle further based on the track comprises:
determining a predicted trajectory for the object based on the track; and
controlling the vehicle further based on the predicted trajectory.

15. A method comprising:
receiving a first sensor observation based on first sensor data representing an environment of a vehicle;
receiving a second sensor observation based on second sensor data representing the environment, wherein the first sensor observation and the second sensor observation represent an object in the environment;
determining, based on a machine learning model, a first similarity matrix including a first similarity value, wherein the first similarity value represents a first similarity of the first sensor observation and the second sensor observation;
determining a track associated with the environment based on the first similarity matrix, wherein the track represents the object;
determining a second similarity matrix that includes a second similarity value, wherein the second similarity value represents a second similarity of a third sensor observation and the track; and
controlling the vehicle based on the second similarity matrix.

16. The method of claim 15, wherein the first similarity value is determined based on a distance between a first embedding of the first sensor observation and a second embedding of the second sensor observation in an embedding space.

17. The method of claim 15, wherein determining the track based on the first similarity matrix comprises:
determining that the track is associated with the environment at a previous time.

18. The method of claim 17, wherein the first similarity matrix is associated with a set of sensor observations comprising the first sensor observation and the second sensor observation, and wherein determining that the track is associated with the environment at the previous time comprises:
determining a set of initial tracks in the environment; and
assigning the set of sensor observations to the set of initial tracks based on the first similarity matrix.

19. The method of claim 18, wherein the first sensor observation and the second sensor observation are determined to not be associated with any individual tracks.

20. The method of claim 15, wherein determining that the first sensor observation is not associated with any individual tracks comprises:
    determining that the second similarity matrix represents, for the first sensor observation and a second track, a third similarity value, wherein the second track is determined based on sensor observation data associated with a previous time; and
    determining, based on the third similarity value, that the first sensor observation is not associated with any individual tracks.

\* \* \* \* \*